United States Patent [19]

Kiuchi

[11] Patent Number: 4,962,512
[45] Date of Patent: Oct. 9, 1990

[54] STEP-UP CIRCUIT

[75] Inventor: Akihiro Kiuchi, Nara, Japan

[73] Assignee: Sharp Kabushiki Kaisha, Osaka, Japan

[21] Appl. No.: 206,221

[22] Filed: Jun. 13, 1988

[30] Foreign Application Priority Data

Jun. 26, 1987 [JP] Japan .................. 62-160681

[51] Int. Cl.$^5$ .............. H02M 3/07; G11C 11/403
[52] U.S. Cl. ..................... 377/78; 377/57; 377/63; 307/602; 363/60; 363/147
[58] Field of Search ........... 307/602, 607; 377/57, 377/78; 363/59, 60

[56] References Cited

U.S. PATENT DOCUMENTS 3,819,953  6/1974  Puckette et al. ............. 307/607
4,186,436  1/1980  Ishiwatari ..................... 363/60
4,214,174  7/1980  Dickson ........................ 377/57
4,803,612  2/1989  Skoumand ..................... 363/60

FOREIGN PATENT DOCUMENTS 0062066   5/1981  Japan ........................... 363/60
2020924  11/1979  United Kingdom ............ 363/60

OTHER PUBLICATIONS

"One Chip Microcomputer with EEPROM for Tuning System of TV Sets", by A. Kiuchi et al., Sharp Giho, vol. 37, p. 88, 1987.

Primary Examiner—John S. Heyman
Attorney, Agent, or Firm—Flehr, Hohbach, Test Albritton & Herbert

[57] ABSTRACT

A step-up circuit is comprised of plurality of charge pumping circuits connected in parallel to an output line. Each charge pumping circuit is activated by a pair of mutually opposite clock signals to produce a higher output voltage than its power source voltage. The clock signals applied to the charge pumping circuits are out of phase with respect to one another such that a stable output of higher voltage can be obtained.

4 Claims, 1 Drawing Sheet

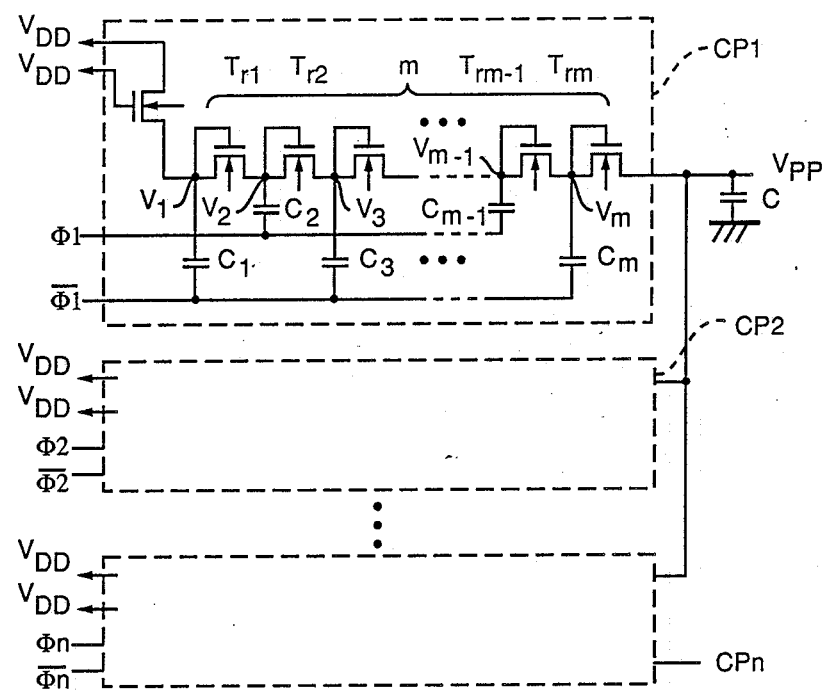
FIG._1A
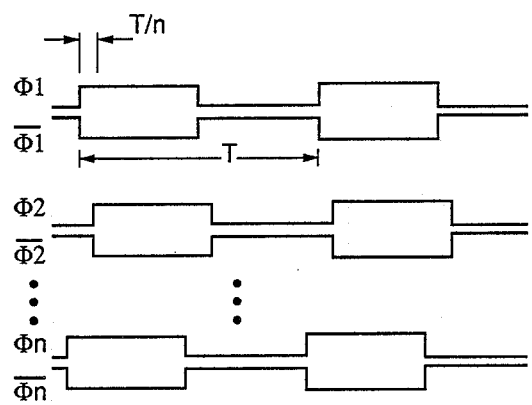
FIG._1B

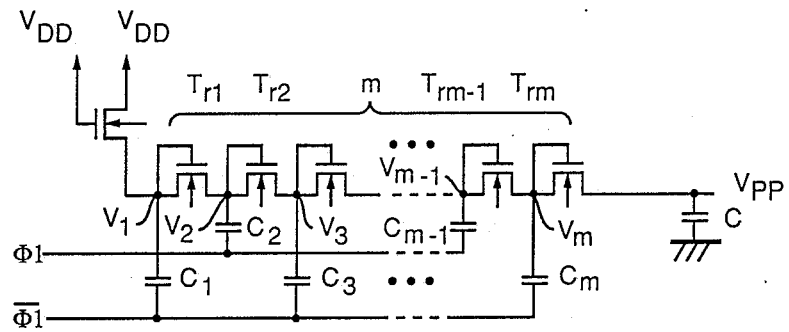
FIG._2A
(PRIOR ART)
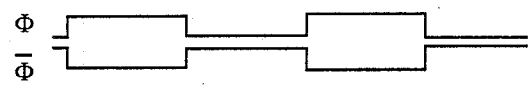
FIG._2B
(PRIOR ART)

STEP-UP CIRCUIT

BACKGROUND OF THE INVENTION

This invention relates to a step-up circuit which uses a charge pump to provide a higher voltage than its power source.

Among the recently developed semiconductor devices are multi-functional one-chip microcomputers and the like containing circuits such as EPROMs and EEPROMs which require for their operation a high voltage of about 20V. In order to make them easier to use, however, they should be designed to depend on only one power source such as a single 5V power line. In other words, such a device must include within itself a step-up circuit to generate a higher voltage from a lower-voltage power source.

An example of step-up circuit using a charge pump is shown in FIG. 2A wherein $\phi$ and $\bar{\phi}$ indicate clock signals which have mutually opposite phases as shown in FIG. 2B. The charge pump is comprised of an array of m (=an integer greater than 1) transfer transistors $Tr_1, \ldots Tr_m$ and, if they are sequentially numbered from 1 to m for convenience, the mutually opposite clock signals $\phi$ and $\bar{\phi}$ are applied respectively to the even-numbered and odd-numbered ones of them through parallel-connected capacitors $C_1, \ldots C_m$ as shown such that each of these capacitors serves to step up the voltage transmitted from one to the next of the transfer transistors in the array to provide a higher voltage $V_{PP}$ from a lower source voltage $V_{DD}$. More in detail, if $V_i$ (i=1, ... m) each indicate the voltage of the junction point between two mutually adjacent transistors as shown in FIG. 2A and $V_{th}$ is the transistors' threshold voltage, $V_1 = V_{DD} - V_{th}$ when the first clock signal $\phi$ is in a high voltage state. Thereafter, when the voltage of the second clock signal $\bar{\phi}$ rises, the voltage $V_1$ is stepped up to $2V_{DD} - V_{th}$ by the first capacitor $C_1$. This switches on the first transfer transistor $Tr_1$ and the voltage $V_2$ becomes $2V_{DD} - 2V_{th}$ and thereby charges up the second capacitor $C_2$. When the voltage of the first clock signal Ⓡ rises again next, the voltage $V_2$ is increased to $3V_{DD} - 2V_{th}$ by the second capacitor $C_2$, thereby switching on the second transfer transistor $Tr_2$. This, in turn, causes the voltage $V_3$ to rise to the level of $3V_{DD} - 3V_{th}$. In this manner, the voltages $V_1, V_2, \ldots$ are increased thereafter in synchronism with the clock signals and a high voltage $V_{PP}$ is finally obtained.

With a step-up circuit thus structured, a high voltage is supplied by charging up a final-stage capacitor C when the second clock signal $\bar{\phi}$ is in a high-voltage period. If the consumption of the high-voltage current therefrom grows abnormally during a low-voltage period of the second clock signal $\bar{\phi}$, however, the high-voltage level is caused to either fluctuate or become lower. In other words, since the desired high voltage is supplied only through the final-stage capacitor C, the final-stage transfer transistor $Tr_m$ is switched on if $V_{PP}$ drops. This has the effect of lowering the voltage $V_m$ and the lowering of this voltage $V_m$ similarly has the effect of lowering the voltages at junctions on the upstream side. As a result, efficiency of the step-up circuit is very adversely affected.

SUMMARY OF THE INVENTION

It is therefore an object of the present invention to provide a step-up circuit with which the drawbacks described above can be eliminated.

A step-up circuit according to the present invention is characterized as having a plurality of parallel-connected charge pumps operated by clock signals which are out of phase with respect to one another such that the output voltage is stabilized against variations in the power consumption.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings:

FIG. 1A is a drawing which schematically shows the structure of a step-up circuit embodying the present invention and FIG. 1B is a waveform diagram for the clock signals applied to the step-up circuit of FIG. 1A, and FIG. 2A is a drawing which schematically shows the structure of a prior art step-up circuit embodying the present invention and FIG. 2B is a waveform diagram for the clock signals applied to the circuit of FIG. 2A.

DETAILED DESCRIPTION OF THE INVENTION

In FIG. 1A, $CP_1, CP_2, \ldots CP_n$ (where n is an integer greater than 2) each indicate a charge pump as shown in FIG. 2A and hence their structure and mode of operation will not be explained again. These charge pumps $CP_1, \ldots CP_n$ are connected in parallel to an output line through which a higher output voltage $V_{PP}$ (than the power source voltage $V_{DD}$) is supplied and to which a final-stage capacitor C is connected as shown.

To operate the step-up circuit thus structured, n clock signals $\phi_1, \ldots \phi_n$ of period T and amplitude $V_{DD}$ but with different phases are provided. FIG. 1B shows a particular embodiment wherein the signals $\phi_1, \ldots \phi_n$ are sequentially shifted in phase by T/n. FIG. 1B also shows the clock signals $\bar{\phi}_1, \ldots \bar{\phi}_n$ which are respectively complementary to, or opposite from, the signals $\phi_1, \ldots \phi_n$. With a step-up circuit thus structured with a plurality (n-number) of parallel-connected charge pumps, the final-stage capacitor C is charged up once ever T/n seconds instead of once every T seconds as by the prior art circuit shown in FIG. 2A. In other words, the high-voltage output from the circuit of FIG. 1A is n times more stable than that from the circuit of FIG. 2A.

The foregoing description of a preferred embodiment of the invention has been presented for purposes of illustration and description. It is not intended to be exhaustive or to limit the invention to the precise form disclosed and many modifications and variations are possible in light of the above teaching. For example, the phase shifts among the clock signals $\bar{\phi}_1, \ldots \bar{\phi}_n$ need not be constant. Equally acceptable results are obtainable by providing clock signals which may not divide the period into equal intervals but the final-stage capacitor C is charged up n times during each period by n charge pumps. Likewise, the structure of the charge pumps is not limited to that disclosed in FIGS. 1A and 2A. Any modifications and variations that may be apparent to a person skilled in the art are intended to be included within the scope of this invention.

What is claimed is:

1. In a step-up circuit with charge pumping means for generating an output voltage higher than a power source voltage, the improvement wherein said step-up circuit comprises a plurality of charge pumping means connected in parallel to an output line and said charge pumping means are activated by pairs of mutually opposite clock signals individually applied thereto, said pairs of clock signals are phase displaced with respect to other pairs of clock signals, whereby said output voltage is supplied more stably against fluctuations.

2. The step-up circuit of claim 1 further comprising a final-stage capacitor connected to said output line.

3. The step-up circuit of claim 1 wherein said pairs of clock signals have amplitude equal to said power source voltage and a same period.

4. The step-up circuit of claim 1 wherein said pairs of clock signals are phase displaced with respect to other pairs by the same amount.

* * * * *